United States Patent
Wang et al.

(10) Patent No.: US 8,271,858 B2
(45) Date of Patent: Sep. 18, 2012

(54) EFFICIENT SOFT VALUE GENERATION FOR CODED BITS IN A TURBO DECODER

(75) Inventors: Yi-Pin Eric Wang, Fremont, CA (US); Jung-Fu Cheng, Fremont, CA (US)

(73) Assignee: Telefonaktiebolget L M Ericsson (Publ), Stockholm (SE)

( * ) Notice: Subject to any disclaimer, the term of this patent is extended or adjusted under 35 U.S.C. 154(b) by 615 days.

(21) Appl. No.: 12/553,324

(22) Filed: Sep. 3, 2009

(65) Prior Publication Data
US 2011/0055667 A1    Mar. 3, 2011

(51) Int. Cl.
*H03M 13/00*    (2006.01)
(52) U.S. Cl. ........ 714/780; 714/786; 714/755; 714/796; 714/792; 714/794
(58) Field of Classification Search .................. 714/755, 714/786, 780, 792, 794–796
See application file for complete search history.

(56) References Cited

U.S. PATENT DOCUMENTS

| 7,464,316 B2 | 12/2008 | Bickerstaff et al. |
| 2005/0102600 A1* | 5/2005 | Anandakumar .............. 714/755 |
| 2007/0147481 A1* | 6/2007 | Bottomley et al. ........... 375/148 |
| 2007/0162812 A1* | 7/2007 | Herrmann ..................... 714/749 |

OTHER PUBLICATIONS

Berrou, C. et al. Near Shannon Limit Error-Correcting Coding and Decoding: Turbo-Codes (1) IEEE, Feb. 2003 p. 1064-1070.
Burr, A. Turbo-codes: the ultimate error control codes? Electronic and Communication Engineering Journal, Aug. 2001 p. 155-165.

* cited by examiner

*Primary Examiner* — Guy Lamarre (57) ABSTRACT

Techniques for generating soft values for parity bits in a convolutional decoding process are disclosed. An exemplary method comprises, for each of at least one iteration in at least one soft-input soft-output decoder, calculating intermediate probability values for each possible transition between a first plurality of candidate decoder states at a first time and a second plurality of candidate decoder states at a second time. Two or more partial sums are then computed from the intermediate probability values, wherein the partial sums correspond to possible combinations of two or more systematic bits, two or more parity bits, or at least one systematic bit and at least one parity bit. Soft values, such as log-likelihood values, are then estimated for each of at least one systematic bit and at least one parity bit of the received communications data corresponding to the interval between the first and second times, based on the partial sums.

15 Claims, 6 Drawing Sheets

EFFICIENT SOFT VALUE GENERATION FOR CODED BITS IN A TURBO DECODER

TECHNICAL FIELD

The present invention relates generally to turbo decoders, as used in wireless communications receivers, and, more particularly, to the generation of soft values for systematic bits and parity bits in such decoders.

BACKGROUND OF THE INVENTION

The basic function of a communication system is to send information over a communication channel from a source that generates the information to one or more destinations. In a digital communication system, the information is converted into a digital format and then transmitted over the communication channel. The transmission of digital information is subject to the adverse effects of the communication channel, such as co-channel and adjacent channel interference, noise, dispersion, and fading. These effects introduce errors into the transmitted data stream. These effects are particularly severe in a radio communication system.

In 1948, Claude E. Shannon demonstrated in a landmark paper that proper encoding of the digital information prior to transmission may reduce the errors introduced by a noisy channel to any desired level. Encoding is the process of adding redundancy to information prior to its transmission so that errors which may occur during transmission can be detected and/or corrected. At the receiving end, the decoder makes use of the redundant information and a priori knowledge of the coding scheme to detect and/or correct errors that may have occurred during transmission.

Many types of error correction codes have been devised, including block codes and convolutional codes. Turbo codes, which were introduced in 1993, are considered to have high error correction capability and good performance and have been selected for use in third and fourth generation mobile communication systems. In its most basic form, a turbo code comprises two parallel systematic convolutional encoders connected in parallel by an interleaver. The first encoder operates on the original input bits and generates first parity bits. The interleaver permutes the order of the input bits and the interleaved bits are supplied to the second encoder. The second encoder operates on the interleaved bits output by the interleaver and generates second parity bits. For each input bit, three output bits are generated: the input (systematic) bit and two parity bits. A puncturing or rate-matching processor may be used following the encoder to select part of these output bits for transmission.

Iterative decoding is used at the receiver to decode turbo codes. A basic turbo decoder comprises two soft-input, soft-output (SISO) decoders connected in series by an interleaver. The received bits (or soft values obtained from the Rake or G-Rake receiver) are input to the first decoder. The first decoder uses the received bits (or soft values) and extrinsic information fed back from the second decoder to generate a soft estimate of the original input bits expressed as a log-likelihood ratio and extrinsic information that is supplied to the second decoder. The extrinsic information output from the first decoder is interleaved before it is input to the second decoder to compensate for the interleaving performed at the encoder. The second decoder generates a more refined log-likelihood estimate of the original input bit and extrinsic information that is fed back to the first decoder. This process repeats for a number of iterations. A final decision about the bit is made by hard limiting the soft estimate output by the second decoder.

The demand for and increasing popularity of broadband wireless communications have driven communication systems designers to seek better and better performance. Receiver technologies in particular play an important role in advancing wireless system performance; these technologies continue to evolve.

In Wideband Code-Division Multiple Access (W-CDMA) systems, for example, Rake receivers were first introduced, and then significant performance improvements over the conventional Rake receiver were achieved with the introduction of linear equalization (e.g., in the so-called G-Rake receiver). However, as the data rate is pushed even higher through the use of higher order modulation and/or multiple-input multiple-output (MIMO) techniques, good performance with linear equalization is becoming more and more difficult to achieve, especially in dispersive channels.

There are a number of known approaches to improve performance beyond that of linear equalization. For example, U.S. patent application Ser. No. 12/035,846, titled "Method and Apparatus for Block-Based Signal Demodulation" and filed 22 Feb. 2008, by Bottomley, et al. (hereinafter "the BDFE application"), describes a block decision-feedback equalizer (BDFE), in which block-based equalization (linear equalization or decision feedback equalization) is used to suppress inter-block interference and to produce detection statistics for the symbols in a symbol block. Joint detection addresses intra-block interference by jointly detecting the most likely combination of symbols within the symbol block, based on the corresponding detection statistics. U.S. Patent Application Publication 2007/0147481, titled "Linear Turbo Equalization Using Despread Values" and filed 22 Dec. 2005 by Bottomley et al. (hereinafter "the Linear Turbo Equalization publication"), describes linear turbo equalization (TE), which is a linear equalizer, based on a generalized-Rake (G-Rake) receiver design, that uses decoder feedback in forming Rake combining weights as well as in forming a self-interference estimate removed from the equalizer signal provided to the decoder. Both the BDFE application and the Linear Turbo Equalization publication are incorporated herein by reference, in their entireties. Various techniques involving successive interference cancellation (SIC) are also known, and are being further developed for use in advanced receivers.

All of these receiver technologies benefit from so-called soft subtraction, in which a soft-value of an interfering symbol can be derived and used in an interference cancellation process. Such soft values can be derived prior to decoding (pre-decoding soft values) or after decoding (post-decoding) a series of estimated symbol values. The former approach is more suitable for block decision-feedback equalization, while the latter is more suitable for linear turbo equalization. Successive interference cancellation techniques can be based on either pre-decoding or post-decoding soft subtraction.

Performance gains from soft subtraction can be substantial. In one study, multi-user detection (MUD) processes based on hard subtraction and soft subtraction were compared for a number of scenarios. With soft subtraction, better multi-user detection performance is consistently achieved, which in return reduces the required received power per user. As a result, the system's aggregate rise-over-thermal is also reduced. In high-data rate scenarios, approximately 1 to 2 dB gain is expected to result from the use of soft subtraction.

SUMMARY

Techniques for generating soft values (e.g., log-likelihood values) for parity bits in a convolutional decoding process are disclosed. In particular, terms used in the formulation of expressions for systematic bit soft values and parity bit soft values are grouped, to simplify the calculations and improve the efficiency of the process.

In an exemplary method, such as might be implemented in a communications receiver for decoding received communications data, the decoding process comprises, for each of at least one iteration in at least one soft-input soft-output decoder, calculating intermediate probability values associated with each possible transition between a first plurality of candidate decoder states at a first time and a second plurality of candidate decoder states at a second time. Two or more partial sums are then computed from the intermediate probability values, wherein the partial sums correspond to possible combinations of two or more systematic bits, two or more parity bits, or at least one systematic bit and at least one parity bit. Soft values, such as log-likelihood values, are then estimated for each of at least one systematic bit of the received communications data corresponding to the interval between the first and second times, as a first function of the partial sums, and soft values are estimated for each of at least one parity bit of the received communications data corresponding to the interval between the first and second times, as a second function of the partial sums.

In some embodiments, calculating intermediate probability values associated with each possible transition between a first plurality of candidate decoder states at a first time and a second plurality of candidate decoder states at a second time is based on forward recursion metrics corresponding to each of the first plurality of candidate decoder states, backward recursion metrics corresponding to each of the second plurality of candidate decoder states, and branch metrics corresponding to each branch between the first and second pluralities of candidate decoder states.

In some embodiments, a radix-2 decoder is used, in which case computing two or more partial sums may comprise computing a partial sum for each possible combination of systematic bit values and parity bit values for the transition between the first and second plurality of candidate decoder states, based on the corresponding intermediate probability values. In other embodiments, a radix-4 decoder is used, in which case computing two or more partial sums may comprise computing a partial sum for each possible combination of two consecutive systematic bit values and a partial sum for each possible combination of two consecutive parity bit values, based on the corresponding intermediate probability values.

The present invention may, of course, be carried out in other ways than those specifically set forth herein without departing from essential characteristics of the invention. For instance, although the inventive techniques disclosed herein are described specifically in the context of decoding processes in WCDMA receivers, and in particular in turbo decoders in WCDMA receivers, these techniques may also be applied to other communications devices and/or to other specific turbo codes. Embodiments of the present invention thus include methods according to one or more of the techniques summarized above, decoder circuits configured to carry out one or more of these methods, and wireless receivers including such decoder circuits. Upon reading the following description and viewing the attached drawings, the skilled practitioner will recognize that the described embodiments of each of these are illustrative and not restrictive, and that all changes coming within the meaning and equivalency range of the appended claims are intended to be embraced herein.

DETAILED DESCRIPTION

The present invention relates generally to turbo coding for mobile communication systems. More specifically, the focus of the discussion below is on techniques for generating soft values in the constituent convolutional decoders of a turbo decoder, including for parity bits. These soft values may be used in subsequent processing that takes advantage of advanced receiver technologies such as linear turbo equalization, successive interference cancellation, or the like.

The discussion below uses the turbo coding used in Wideband Code-Division Multiple Access (W-CDMA) systems as an example. However, those skilled in the art will appreciate that the inventive techniques disclosed herein are not limited to that context, but may applied to other communication systems, such as the so-called Long-Term Evolution (LTE) and LTE-advanced systems under development by members of the $3^{rd}$-Generation Partnership Project. Indeed these inventive techniques may be applied whenever soft values (e.g., log-likelihood values) are needed for parity bits as well as systematic bits, such as for use in a turbo equalization or soft cancellation process.

For a receiver to employ post-decoding soft subtraction, such as in a turbo equalization or interference cancellation process, the decoder needs to generate a soft value (e.g., a log-likelihood value) for each encoded bit. Typically, the encoded bits consist of systematic bits (i.e., the information bits themselves) as well as parity bits (i.e., redundant bits generated in the encoding process). Turbo decoders employed today already generate soft values for the systematic bits, but do not generally provide soft values for the parity bits. Thus, today's turbo decoders must be modified to generate these soft values for parity bits, to support post-decoding soft subtraction.

One approach to generating soft values (e.g., log-likelihood values) for parity bits is to simply extend the well known methods and computations used today to generate soft values for systematic bits. However, implementing these extensions can result in a significant increase in the computational complexity of the decoder.

The new decoder processing techniques discussed below can substantially reduce decoder complexity, compared to simple extensions of existing decoder processes. This is accomplished by recognizing that the processes of generating log-likelihood values for systematic bits and generating log-likelihood values for parity can be adapted so that they have a number of computations in common. Then, the decoder complexity can be reduced by sharing the results of the common computations. In the detailed discussion that follows, this approach is applied to a conventional radix-2 turbo decoder, where one trellis stage is processed at a time, and to a radix-4 turbo decoder, where two trellis stages are processed at a time. However, these techniques are not limited to these particular applications.

Figure 1:
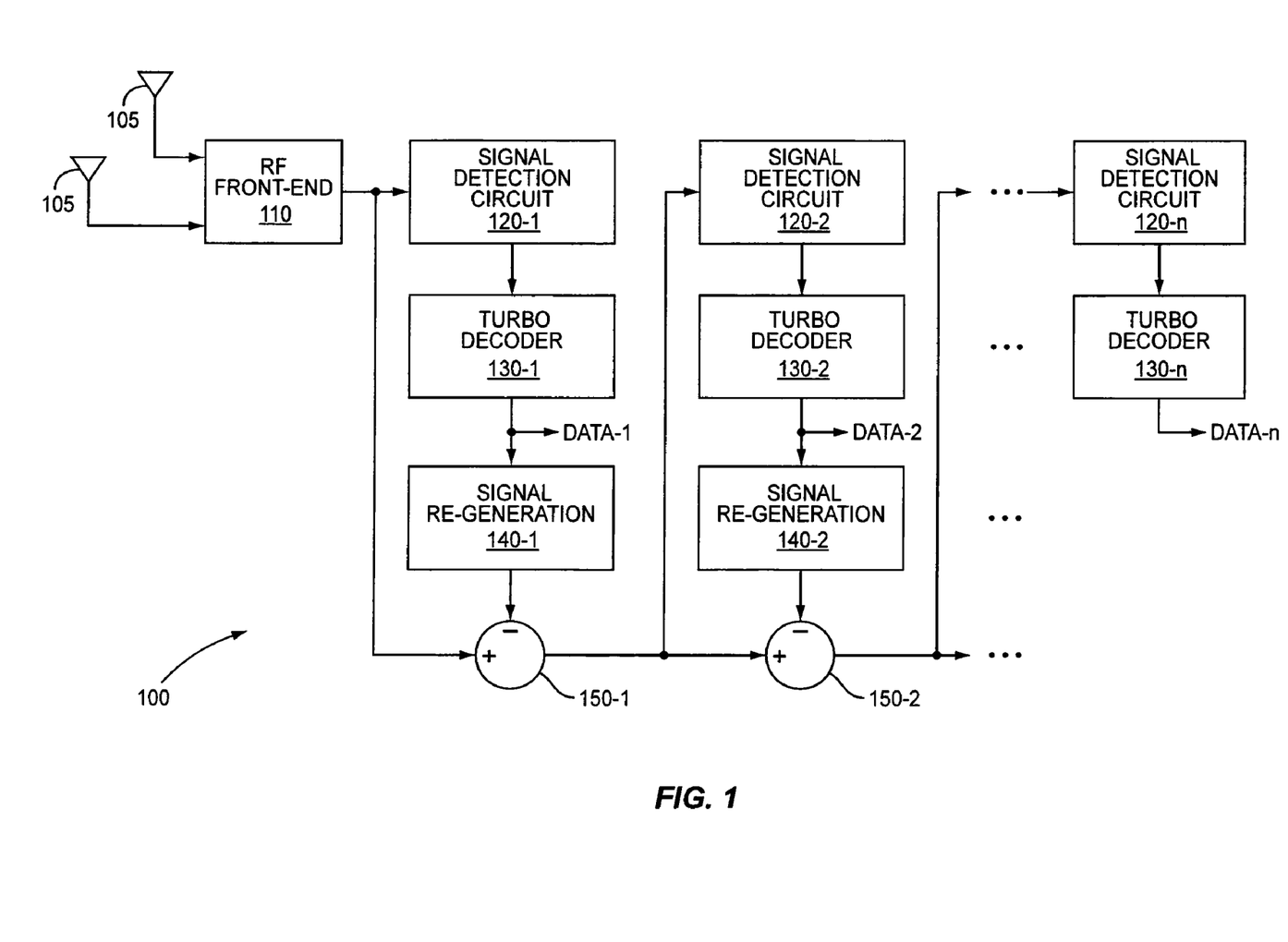
FIG. 1 is a block diagram of an exemplary receiver circuit employing successive interference cancellation.

As an example of an application for the decoding techniques to be described in detail below, FIG. 1 illustrates a wireless communications receiver 100 that employs successive interference cancellation techniques to separate n (two or more) data streams that are separately modulated and encoded but simultaneously transmitted. The transmitted signal is received via antennas 105, and the received signal amplified, downconverted, and digitized in RF front-end section 110, according to conventional techniques. The digitized signal samples are then processed by a first signal detection circuit 120-1, which may be a Rake or G-Rake receiver, for example. Signal detection circuit 120-1 generates detected symbols, which are passed to a first turbo-decoder circuit 130-1. The output of the first turbo-decoder circuit 130-1, designated DATA-1, is then provided to signal generation circuit 140-1, which re-encodes DATA-1, using the same turbo coding originally applied to the data, and re-modulates the encoded data according to the original modulation scheme. Thus, the output of signal generation circuit 140-1 is effectively a replica of the originally transmitted signal corresponding to DATA-1. With appropriate gain control and sampling, this replica can be subtracted from the output of RF front-end circuit 110, to produce a new sampled received signal that is largely free of a signal component corresponding to the first data stream. Accordingly, interference to other data streams that would otherwise be caused by the DATA-1 signal component can be substantially reduced. Subsequent stages, such as a second stage including signal detection 120-2, turbo decoder 130-2, and signal generation circuit 140-2, can repeat the process for additional data streams. Of course, the final stage, which includes signal detection circuit 120-n and turbo decoder 130-n, need not include a signal generation circuit.

Although "hard" bit or symbol values (i.e., bit or symbol values which are definitively mapped to discrete possible values, such as "1" and "0") can be used to re-generate a received signal (as in signal generation circuit 140, for example) for interference cancellation, the use of soft values can improve system performance, as the soft values better incorporate all of the information available to the receiver. As noted earlier, conventional turbo decoders are often configured to produce soft values for systematic bits of an encoded data sequence, but are not usually configured to produce soft values for the parity bits. For a receiver to fully benefit from soft subtraction techniques, soft values are needed for the parity bits as well.

Figure 2:
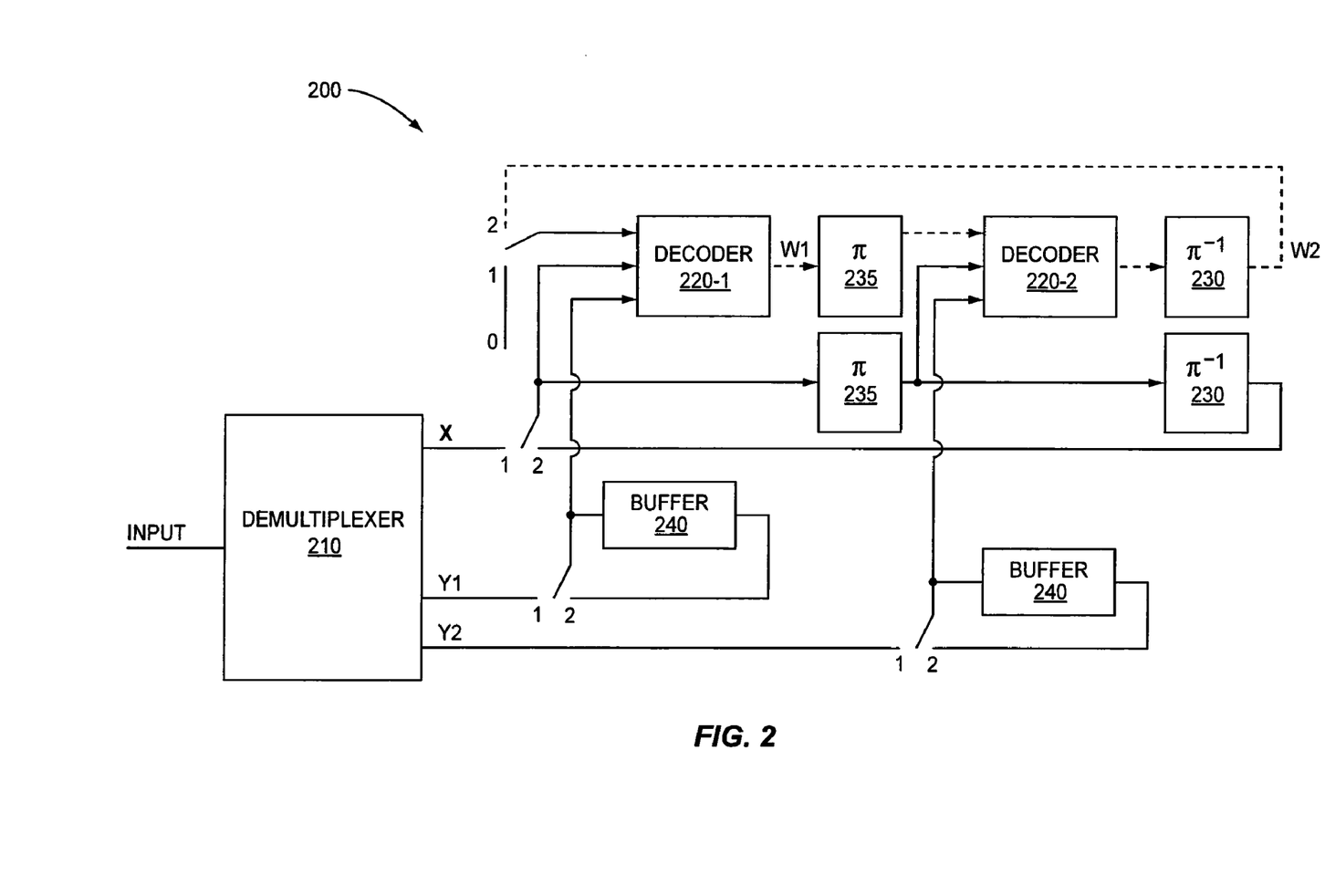
FIG. 2 is a block diagram of an exemplary turbo decoder.

To provide additional context for the discussion that follows, FIG. 2 provides a functional block diagram for an exemplary turbo decoder 200. Those skilled in the art will appreciate that the pictured turbo decoder 200 is an iterative decoder. In a first iteration, each of the several illustrated switches is in a first position (indicated by a "1"), and the first and second decoders (decoders 220-1 and 220-2, respectively) operate on new systematic bits ("X") and the first and second parity bits ("Y1" and "Y2") as received from demultiplexer 210. In subsequent iterations, the switches are in a second position (indicated by a "2"), and decoders 220-1 and 220-2 each operate on data that is fed back from a previous iteration. Those skilled in the art will readily recognize the remaining components of the illustrated decoder 200, including the interleavers 235, de-interleavers 230, and buffers 240. The details of each of these functional elements are well known to users and designers of turbo decoders, and are not necessary to a complete understanding of the present invention; thus, extensive details of these elements are not presented here.

At a general level, however, turbo decoder 200 comprises a demultiplexer 210, which separates received (detected) data symbols into systematic data X, first parity bits Y1, and second parity bits Y2. Those skilled in the art will appreciate that any or all of the bit-streams X, Y1, and Y2 may contain bit errors that occurred during transmission. Those skilled in the art will also appreciate that any of the bit-streams X, Y1, and Y2 may contain zero values inserted by a de-puncturing or de-rate-matching processor. The function of turbo decoder 200 is to detect and correct the erroneous or missing bits.

First decoder 220-1 operates on systematic data X and parity bits Y1, and generates first extrinsic information (W1) at its output. During the first iteration, decoder 220-1 uses only the systematic data X and parity bits Y1; for subsequent iterations, systematic data X is combined with second intrinsic information (W2) fed back from second decoder 220-2. (The details of combining the systematic data X with the intrinsic information are not illustrated in FIG. 2 or described herein; those details are well known to those with more than a passing knowledge of turbo decoders.) Similarly, the second decoder 220-2 operates on interleaved systematic data, parity bits Y2, and (for second and subsequent iterations) the interleaved extrinsic information W1 generated by the first decoder 220-1. De-interleavers 230 restore the decoded information to its original order for second and subsequent iterations of the decoder, as well as for the final output.

Turbo decoder 200 relies on the exchange of soft information between the constituent convolutional decoders 220-1 and 220-2. These decoding units are therefore required to be able to accept soft inputs and generate updated soft outputs. A number of practical soft-input, soft-output decoding algorithms are known, including several based on the maximum a posteriori (MAP) algorithm described by L. R. Bahl et al., "Optimal decoding of linear codes for minimizing symbol error rate," *IEEE Trans. on Information Theory*, vol. 20, pp. 284-287, March 1974 (hereinafter "Bahl"), and formulations of the MAP algorithm in the logarithmic domain (Log-MAP algorithm).

The derivation of the MAP and Log-MAP algorithms can be found in literature well known to those skilled in the art, including in Bahl as well as in Pietrobon et al., "A simplification of the modified Bahl decoding algorithm for systematic convolutional codes," *Proceedings of IEEE International Symposium on Information Theory '94*, pp. 1073-1077, November 1994 (hereinafter "Pietrobon"), and Robertson et al., "A comparison of optimal and sub-optimal MAP decoding algorithms operating in the log domain," *Proceedings of IEEE International Communications Conference '95*, pp. 1009-1013, June 1995.

One suitable algorithm for rate ½ convolutional codes is similar to the formulation by Pietrobon. First, suppose the state at time t is $S_t=s$, where $s \in \{0, 1, \ldots, 2^v-1\}$ and v is the size of the encoder memory. A representation of a portion of a state trellis is given in FIG. 3, where it can be seen that the next input bit $d_{t+1}$ (following state $S_t=s$) leads the state to $S_{t+1}=F(s, d_{t+1})$, and induces a parity output $p_{t+1}=p(s,d_{t+1})$. Similarly, the input bit $d_t$ leads the state $S_{t-1}=B(s,d_t)$ to $S_t=s$, and induces a parity output $p_t=p(B(s,d_t),d_t)$. B(s,d), F(s,d), and p(s,d) are deterministic functions uniquely specified by the trellis of the constituent recursive systematic convolutional code. The coded bits $d_t/p_t$ are then assumed to be received as $X_t/Y_t$ over a memoryless channel.

Figure 3:
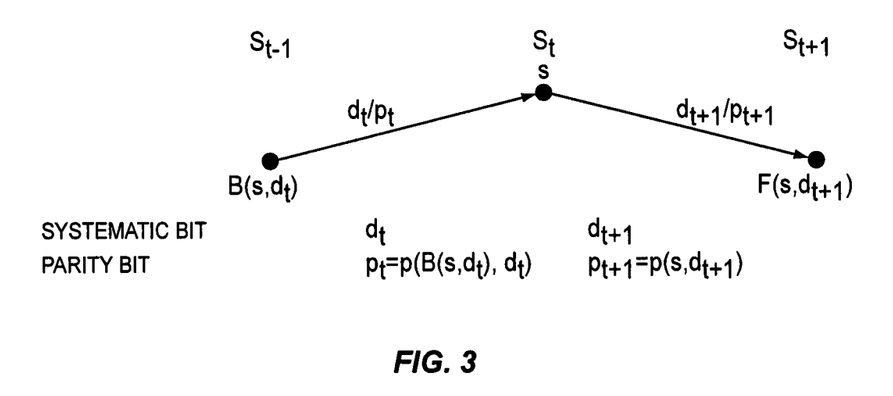
FIG. 3 illustrates a portion of a trellis diagram.

Given the a priori log-likelihood ratio $V=(V_1, V_2, \ldots, V_L)$, the normalized received systematic bit signals $X=(X_1,$ $X_2, \ldots, X_L$), and the normalized received parity bit signals $Y=(Y_1, Y_2, \ldots, Y_L)$, the a posteriori likelihood ratio can be shown to be:

$$\Lambda_t \square \log \frac{Pr\{d_t = 1 | V, X, Y\}}{Pr\{d_t = 0 | V, X, Y\}} = V_t + X_t + W_t, \quad (1)$$

where the extrinsic information $W_t$ is computed as:

$$W_t = \underset{s}{COM}(\alpha_t[s] + p(s, 1)Y_t + \beta_{t+1}[F(s, 1)]) - \quad (2)$$
$$\underset{s}{COM}(\alpha_t[s] + p(s, 0)Y_t + \beta_{t+1}[F(s, 0)]),$$

for $t=1, 2, \ldots, L$. The COM operation in the above equation is defined as:

$$\underset{i}{COM}(x_i) \square \log\left(\sum_i e^{x_i}\right). \quad (3)$$

The a posteriori likelihood ratios $\Lambda_t$ can be used for making hard decisions about the data bits $d_t$, for $t=1, 2, \ldots, L$. Specifically:

$$\hat{d}_t = \begin{cases} 1, & \text{if } \Lambda_t \geq 0 \\ 0, & \text{if } \Lambda_t < 0. \end{cases} \quad (4)$$

The backward recursion metric $\beta_t[s]$ and the forward recursion metric $\alpha_t[s]$ for each state are computed by a pair of recursions. For a terminated trellis, the backward recursion metrics are initialized as:

$$\beta_L[s] = \begin{cases} \infty, & \text{for } s = 0 \\ 0, & \text{otherwise,} \end{cases} \quad (5)$$

and the forward recursion metrics initialized as:

$$\alpha_0[s] = \begin{cases} \infty, & \text{for } s = 0 \\ 0, & \text{otherwise.} \end{cases} \quad (6)$$

Then, for $t=L-1, L-2, \ldots, 1$ and $\forall s = S$:

$$\beta_t[s] = COM(\beta_{t+1}[F(s,0)] + p(s,0)Y_t, \beta_{t+1}[F(s,1)] + p(s,1)Y_t + V_t + X_t), \quad (7)$$

and, for $t=1, 2, \ldots, L-1$ and $\forall s = S$:

$$\alpha_{t+1}[s] = COM(\alpha_t[B(s,0)] + p(B(s,0),0)Y_t, \alpha_t[B(s,1)] + p(B(s,1),1)Y_t + V_t + X_t). \quad (8)$$

The recursions of the Log-MAP algorithm are thus very similar to two Viterbi recursions visiting the trellis states in opposite directions. At each time step of the individual recursion, the branch metrics are added to the state metrics, but, instead of taking the maximum of the two incoming metrics, the new state metrics are obtained as $COM(x,y)=\log(e^x+e^y)$. After both of the recursions complete, the "combined metrics," $\alpha_t[s]+p(s,d_t)Y_t+B_{t+1}[F(s,d_t)]$, of the trellis branches are collected into two sets. One corresponds to the transitions generated by $d_t=1$ and the other corresponds to the transitions generated by $d_t=0$. The final soft output is obtained by taking the difference of the two results from applying the COM operations on these two sets.

Figure 4:
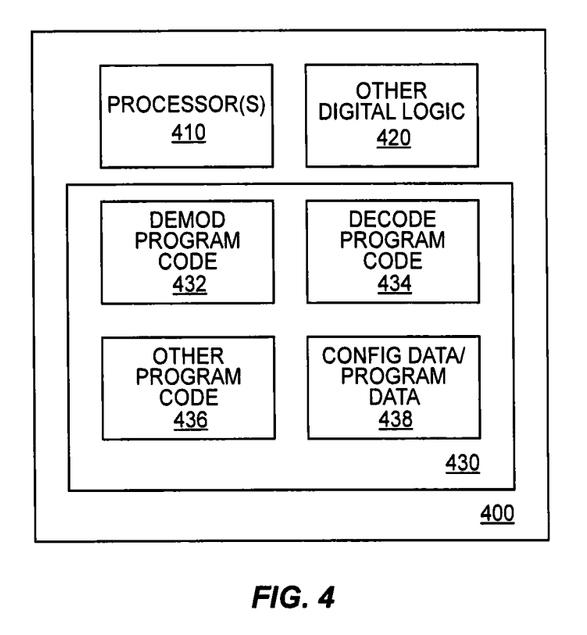
FIG. 4 is a block diagram illustrating components of an exemplary processing circuit according to some embodiments of the present invention.

FIG. 4 illustrates an exemplary receiver processing circuit 400, such as might be used in a wireless communications receiver configured to receive turbo coded communications data. Processing circuit 400 includes one or more processors 410, which might include one or more microprocessors, microcontrollers, digital signal processors, or the like. Processing circuit 400 further includes other digital logic 420, which may include, in some embodiments, customized logic for carrying out all or part of one or more of the functions of the turbo decoder illustrated in FIG. 2, including the soft-input soft-output convolutional decoder operations discussed above, and/or for implementing all or part of the signal detection and/or signal regeneration functions illustrated generally in FIG. 1.

Processors 410 are configured with appropriate software and/or firmware, according to conventional techniques, to carry out the decoding techniques described in detail below. Thus, processing circuit 400 includes memory 430 (which may actually comprise several memory devices, of different types, in some embodiments), which stores decode program code 434. Decode program code 434 comprises program instructions, which, when executed by processors 410, allow processing circuit 400 to carry out one or more of the decoding processes described herein. Memory 430 also includes demodulation program code 432, comprising program instructions for demodulating the received signal, in one or more demodulation stages, as well as other program code 436, which may include program instructions for carrying out other signal processing functions, implementing one or more protocol layers of a communications protocol such as those specified for WCDMA devices, and the like. Finally, memory 430 includes configuration data and program data 438, which may be stored in random access memory (RAM) for use by the demodulation, decoding, and other processes.

Those skilled in the art will appreciate, of course, that processing circuit 400 may comprise, in various embodiments, one or several application-specific integrated circuits, a combination of "off-the-shelf" components, or both. Memory 430, in particular, may comprise one or several physical components, and may comprise several memory types, such as Flash, read-only memory (ROM), RAM, optical storage devices, magnetic storage devices, etc.

Figure 5:
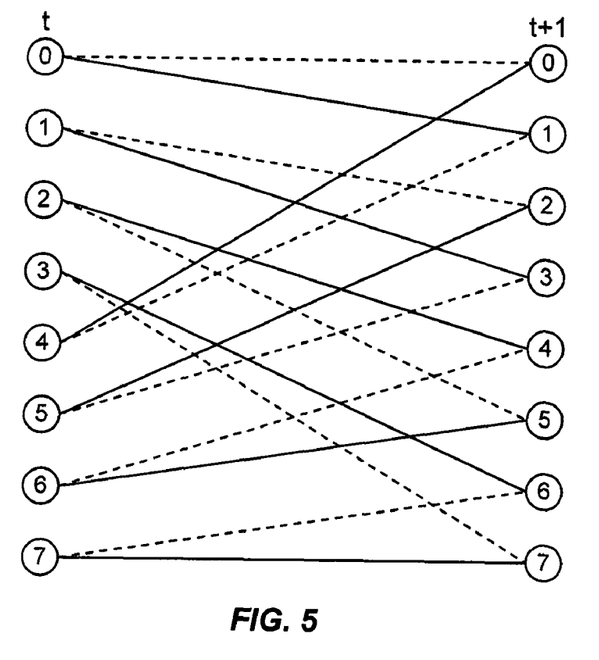
FIG. 5 is a state transition diagram for the W-CDMA turbo code, illustrating transitions according to a systematic bit.

With the above background in mind, those skilled in the art will appreciate that FIG. 5 is a state transition diagram for the WCDMA turbo code, as specified in 3GPP TS 25.212, v.8.5.0, "3rd Generation Partnership Project; Technical Specification Group Radio Access Network; Multiplexing and channel coding (FDD) (Release 8)," March 2009, pp. 18-23. In particular, FIG. 5 illustrates transitions from each of the possible states at time t, indicated by the circles on the left, to the possible states, at time t+1. The solid lines in FIG. 5 indicate transitions triggered by a systematic bit equal to 1, while the dashed lines represent transitions triggered by a systematic bit equal to 0.

As discussed above (and as shown in Bahl, e.g.), each state at time t may be associated with a forward-recursion metric, $\alpha_t(s)$, and a backward recursion metric $\beta_t(s)$. Further details of how to obtain these metrics are given in Bahl, and are well known to those skilled in the art. Bahl also shows that a log-likelihood value for an information (systematic) bit at time t can be generated according to:

$$\lambda_s(t) = COM_{(s_1,s_2) \in \chi_s(1)}(\alpha_t(s_1) + \gamma_t(s_1,s_2) + \beta_{t+1}(s_2)) - COM_{(s_1,s_2) \in \chi_s(0)}(\alpha_t(s_1) + \gamma_t(s_1,s_2) + \beta_{t+1}(s_2)) \quad (9)$$

where $\chi_s(i)$ is the set of state transitions triggered by a systematic bit equal to i, for i=1 or 0; and $\gamma_t(s_1,s_2)$ is the branch metric at time t, corresponding to the transition from state $s_1$ to $s_2$. For a transition belonging to $\chi_s(1)$, the branch metric is $\gamma_t(s_1,s_2)=p(s_1,1)Y_t$. For a transition belonging to $\chi_s(0)$, the branch metric is $\gamma_t(s_1,s_2)=p(s_1,0)Y_t$.

Those skilled in the art will appreciate that the COM(□) operation can be approximated using any of a number of approximation techniques that reduce computational complexity, such as the techniques demonstrated in J.-F. Cheng et al., "Linearly approximated log-MAP algorithms for turbo decoding," *Proc. IEEE Vehicular Technology Conference 2000 Spring*, May 2000. Most notably, practical implementations frequently approximate the COM operation with the max operation, i.e., $$COM_i(x_i) \approx \max_i(x_i).$$

In any case, it should be clear to those skilled in the art that the decoding techniques taught herein may incorporate any of these exact or approximated implementations of the COM(□) operation.

Referring to the details of Equation (9), it can be seen that the first COM(□) operation serves to process the terms associated with all transitions triggered by a systematic bit equal to 1, whereas the second COM(□) operation processes the terms associated with the transitions trigger by a systematic bit equal to 0. With reference to FIG. 5, it can be seen that the terms associated with transitions triggered by a systematic bit equal to 1 are:

$$x_1=\alpha_t(0)+\gamma_t(0,1)+\beta_{t+1} \qquad (1)$$

$$x_2=\alpha_t(1)+\gamma_t(1,3)+\beta_{t+1} \qquad (3)$$

$$x_3=\alpha_t(2)+\gamma_t(2,4)+\beta_{t+1} \qquad (4)$$

$$x_4=\alpha_t(3)+\gamma_t(3,6)+\beta_{t+1} \qquad (6)$$

$$x_5=\alpha_t(4)+\gamma_t(4,0)+\beta_{t+1} \qquad (0)$$

$$x_6=\alpha_t(5)+\gamma_t(5,2)+\beta_{t+1} \qquad (2)$$

$$x_7=\alpha_t(6)+\gamma_t(6,5)+\beta_{t+1} \qquad (5)$$

$$x_8=\alpha_t(7)+\gamma_t(7,7)+\beta_{t+1} \qquad (7).$$

These terms $x_1, x_2, \ldots x_8$ are examples of intermediate probability values—generally speaking an intermediate probability value corresponds to each possible transition between a candidate decoder state (i.e., "candidate decoder states) at a first time and a second candidate decoder state at a second time, and represents the probability of the corresponding transition, given the extrinsic and intrinsic information available to the decoder. Thus, those skilled in the art will appreciate that the first intermediate probability value above, $x_1$, represents the probability, given all the information available to the decoder, that a branch in the decoded sequence passes through state (0) at time t and transitions to state (1) at time t+1. Likewise the last term above, $x_8$, represents the probability that a branch in the decoded sequence passes through state (7) at time t and transitions to state (7) at time t+1. Each of the eight terms above is associated with a transition triggered by a systematic bit having a value of 1, thus $COM(x_1+x_2+x_3+x_4+x_5+x_6+x_7+x_8)$ represents the total probability that the systematic bit value is 1.

Similarly, the terms (intermediate probability values) associated with transitions triggered by a systematic bit equal to 0 are:

$$x_9=\alpha_t(0)+\gamma_t(0,0)+\beta_{t+1} \qquad (0)$$

$$x_{10}=\alpha_t(1)+\gamma_t(1,2)+\beta_{t+1} \qquad (2)$$

$$x_{11}=\alpha_t(2)+\gamma_t(2,5)+\beta_{t+1} \qquad (5)$$

$$x_{12}=\alpha_t(3)+\gamma_t(3,7)+\beta_{t+1} \qquad (7)$$

$$x_{13}=\alpha_t(4)+\gamma_t(4,1)+\beta_{t+1} \qquad (1)$$

$$x_{14}=\alpha_t(5)+\gamma_t(5,3)+\beta_{t+1} \qquad (3)$$

$$x_{15}=\alpha_t(6)+\gamma_t(6,4)+\beta_{t+1} \qquad (4)$$

$$x_{16}=\alpha_t(7)+\gamma_t(7,6)+\beta_{t+1} \qquad (6).$$

Thus, Equation (9) can be re-written as $$\lambda_s(t)=COM(x_1+x_2+x_3+x_4+x_5+x_6+x_7+x_8)-COM(x_9+x_{10}+x_{11}+x_{12}+x_{13}+x_{14}+x_{15}+x_{16}). \qquad (10)$$

This expression effectively computes the probability that the systematic bit at time t is a 1, less the probability that the systematic bit at time t is a 0, in log-likelihood form.

Figure 6:
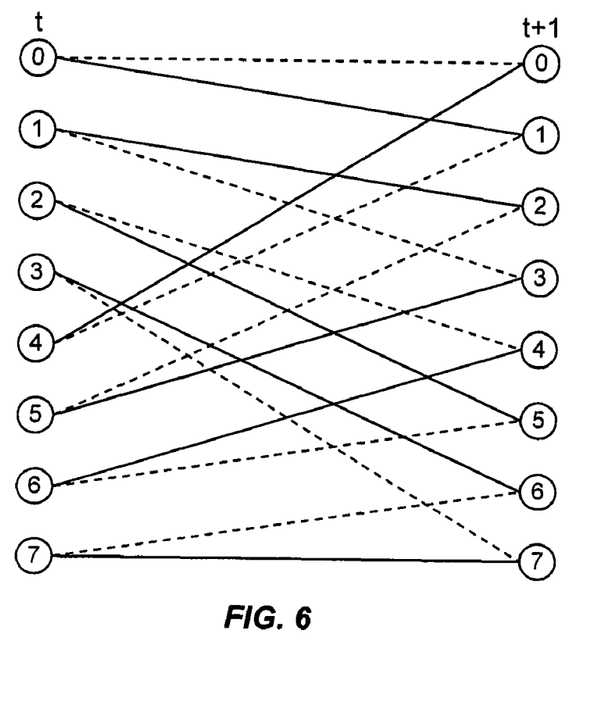
FIG. 6 is a state transition diagram for the W-CDMA turbo code, illustrating transitions according to a parity bit.

The state transition diagram of the WCDMA turbo code can also be illustrated according to a parity bit being 1 or 0. Thus, FIG. 6 illustrates the state transitions of the same WCDMA turbo code, but with the solid lines now representing transitions associated with a parity bit equal to 1, and the dashed lines representing transitions associated with a parity bit equal to 0. The log-likelihood values of parity bits can be generated using the same approach as before, i.e. using the COM(□) operation to process all the terms associated with parity 1 and 0, respectively, and then taking the difference:

$$\lambda_p(t)=COM_{(s_1,s_2)\in\chi_p(1)}(\alpha_t(s_1)+\gamma_t(s_1,s_2)+\beta_{t+1}(s_2))-COM_{(s_1,s_2)\in\chi_p(0)}(\alpha_t(s_1)+\gamma_t(s_1,s_2)+\beta_{t+1}(s_2)). \qquad (11)$$

Here, $\chi_p(i)$ is the set of state transitions associated with a parity bit equal to i, for i=1 or 0.

With reference now to the state transitions illustrated in FIG. 6, the terms associated with the transitions according to a parity bit equal to 1 are:

$$\alpha_t(0)+\gamma_t(0,1)+\beta_{t+1}(1)=x_1$$

$$\alpha_t(1)+\gamma_t(1,2)+\beta_{t+1}(2)=x_{10}$$

$$\alpha_t(2)+\gamma_t(2,5)+\beta_{t+1}(5)=x_{11}$$

$$\alpha_t(3)+\gamma_t(3,6)+\beta_{t+1}(6)=x_4$$

$$\alpha_t(4)+\gamma_t(4,0)+\beta_{t+1}(0)=x_5$$

$$\alpha_t(5)+\gamma_t(5,3)+\beta_{t+1}(3)=x_{14}$$

$$\alpha_t(6)+\gamma_t(6,4)+\beta_{t+1}(4)=x_{15}$$

$$\alpha_t(7)+\gamma_t(7,7)+\beta_{t+1}(7)=x_8.$$

Similarly, the terms associated with the transitions according to a parity bit equal to 0 are $$\alpha_t(0)+\gamma_t(0,0)+\beta_{t+1}(0)=x_9$$

$$\alpha_t(1)+\gamma_t(1,3)+\beta_{t+1}(3)=x_2$$

$$\alpha_t(2)+\gamma_t(2,4)+\beta_{t+1}(4)=x_3$$

$$\alpha_t(3)+\gamma_t(3,7)+\beta_{t+1}(7)=x_{12}$$

$$\alpha_t(4)+\gamma_t(4,1)+\beta_{t+1}(1)=x_{13}$$

$$\alpha_t(5)+\gamma_t(5,2)+\beta_{t+1}(2)=x_6$$

$$\alpha_t(6)+\gamma_t(6,5)+\beta_{t+1}(5)=x_7$$

$$\alpha_t(7)+\gamma_t(7,6)+\beta_{t+1}(6)=x_{16}.$$

Equation (11) can therefore be re-written as:

$$\lambda_p(t)=COM(x_1+x_{10}+x_{11}+x_4+x_5+x_{14}+x_{15}+x_8)-COM(x_9+x_2+x_3+x_{12}+x_{13}+x_6+x_7+x_{16}). \quad (12)$$

Those skilled in the art will therefore appreciate that each of the terms $x_1, x_2, \ldots x_{16}$ is used in calculating log-likelihood values for both the systematic and parity bits. These terms are used in different groupings, as seen in Equations (10) and (12). However, common elements of those groupings may be exploited to simplify the calculations.

To see this, first consider that the COM(□) operation has the property that:

$$COM(a,b,c,d,e,f,g,h)=COM(COM(a,b,c,d),COM(e,f,g,h)). \quad (13)$$

This property may be exploited by grouping the common terms of Equations (10) and (12). This allows the following series of computations to be used to calculate systematic and parity bits soft log-likelihood values, in a more efficient manner than if Equations (10) and (12) were used separately.

First, the COM(□) operation is applied to a first grouping of intermediate probability values corresponding to the transition between times t and t+1, to obtain a partial sum:

$$\omega_1=COM(x_1,x_4,x_5,x_8). \quad (14)$$

This first partial sum $\omega_1$ corresponds to the total probability that a systematic bit value of one and a parity bit value of one were received, for time t. Similarly, additional partial sums, corresponding to other possible combinations of systematic bit values and parity bit values are computed, according to:

$$\omega_2=COM(x_2,x_3,x_6,x_7), \quad (15)$$

$$\omega_3=COM(x_9,x_{12},x_{13},x_{16}), \quad (16)$$

and $$\omega_4=COM(x_{10},x_{11},x_{14},x_{15}). \quad (17)$$

Next, the log-likelihood value for the systematic bit at time t is calculated as a function of the partial sums:

$$\lambda_s(t)=COM(\omega_1,\omega_2)-COM(\omega_3,\omega_4), \quad (18)$$

and the log-likelihood value for the parity bit at time t is calculated as:

$$\lambda_s(t)=COM(\omega_1,\omega_4)-COM(\omega_2,\omega_3). \quad (19)$$

As noted above, the partial sum $\omega_1$ combines terms associated with all transitions for which the systematic bit and parity bit are both equal to 1. Similarly, $\omega_2$ represents a partial sum that combines terms associated with transitions for which the systematic bit equals 1 and the parity bit equals 0, $\omega_3$ represents a partial sum that combines terms associated with transitions for which both the systematic bit and parity bit equal 0, and $\omega_4$ represents a partial sum that combines terms associated with transitions for which the systematic bit equals 0 and the parity bit equals 1.

A brute-force computation for obtaining a parity bit soft value, e.g., using Equation (12) directly, would have required thirty-two additions to obtain each of the $x_i$ terms, fourteen additions to perform the COM(□) operations, and one more addition (or subtraction) to obtain the final soft value. Thus forty-seven additions are required to compute a parity bit soft value. With the approach outlined above, however only three additions are required to compute the soft value for the parity bit, in addition to those already needed to compute the soft value for the systematic bit. This represents a 94% reduction in complexity, compared to the brute-force scheme, for computing a soft value for the parity bit.

If the complexity of generating soft values for the systematic bit and the parity bits are considered together, for a rate-⅓ turbo code, the brute-force scheme requires 47*3=141 additions, whereas the approach described above reduces the needed addition operations to 47+3+3=53, a reduction of 62.4%. In WCDMA and LTE systems, higher coding rates are obtained through puncturing the parity bits. However, the operations of undo-puncturing and puncturing occur outside of the encoder and decoder. Thus, the turbo decoder will always use the trellis of the "mother" rate-⅓ code in decoding. This means that the complexity saving achieved by the proposed scheme is the same for all effective code rates in these systems.

Figure 7:
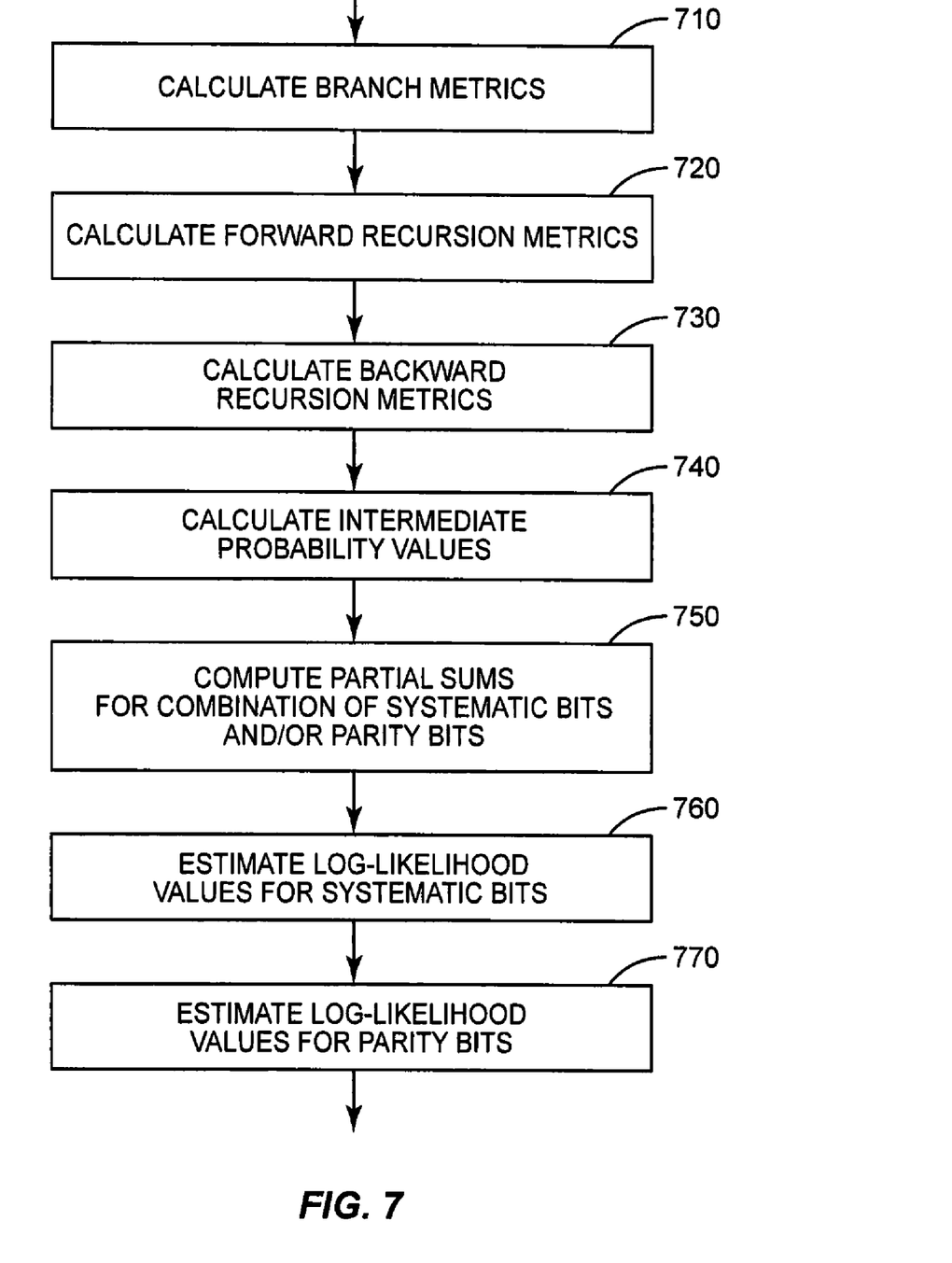
FIG. 7 is a process flow diagram illustrating an exemplary method for generating soft values in a turbo decoder.

With the specific techniques for a WCDMA turbo decoder in mind, those skilled in the art will appreciate that the process flow diagram of FIG. 7 illustrates a generalized method of decoding received communications data encoded at a communications transmitter. More particularly, FIG. 7 illustrates a process implemented by at least one constituent soft-input soft-output (SISO) convolutional decoder, for at least one iteration of a turbo decoding process.

As shown at blocks 710, the process for a given iteration begins with the calculation of branch metrics, according to known techniques; these branch metrics correspond to each branch between a first plurality of candidate decoder states, at a first time, and a second plurality of candidate decoder states, at a second time. Similarly, forward recursion metrics, corresponding to each of the candidate decoder states, and backward recursion metrics, corresponding to each of the candidate decoder states are calculated for all t, t=0, 1, . . . , L, as shown at blocks 720 and 730, respectively.

The process continues, as shown at block 740, with the calculating of intermediate probability values associated with each possible transition between the first plurality of candidate decoder states and the second plurality of candidate decoder states. These intermediate probability values are computed as a function of the branch metrics corresponding to each transition, the forward recursion metrics corresponding to each beginning candidate decoder state, and the backward recursion metrics corresponding to each ending candidate decoder state.

Next, as shown at block 750, a partial sum for each of several combinations of systematic bit values and/or parity bit values is computed. In a radix-2 decoder, such as the decoder discussed above in connection with FIGS. 5 and 6, these computations may take the form of Equations (14)-(17), for example. In this case, four partial sums are computed, each partial sum corresponding to a possible combination of systematic bit and parity bit values for the transition between the first and second decoder states. Later, computations of partial sums for an exemplary radix-4 decoder are shown.

As shown at block 750, the partial sums are used to compute a soft value for at least one systematic bit corresponding to the interval (transition) between the first and second times. Similarly, as shown at block 760, the partial sums are used to compute a soft value for at least one parity bit corresponding to the transition of interest. For the exemplary radix-2 decoder discussed above, these computations may take the form of Equations (18) and (19), for example. The application of these techniques to a radix-4 decoder is discussed below.

In order to increase turbo decoding throughput, a radix-4 turbo decoder has been proposed recently (see M. Bickerstaff, L. Davis, C. Thomas, D. Garrett and C. Nicol, "A 24 Mb/s Radix-4 LogMAP Turbo Decoder for 3GPP-HSDPA Mobile Wireless," *Proc. IEEE International Solid-State Circuits Conference*, 2003). Compared to a conventional (radix-2) turbo decoder that processes one trellis stage at a time, a radix-4 turbo decoder processes two trellis stages to double the decoding throughput. The radix-4 turbo decoder could become more important as the data rate in cellular systems increases higher and higher.

Figure 8:
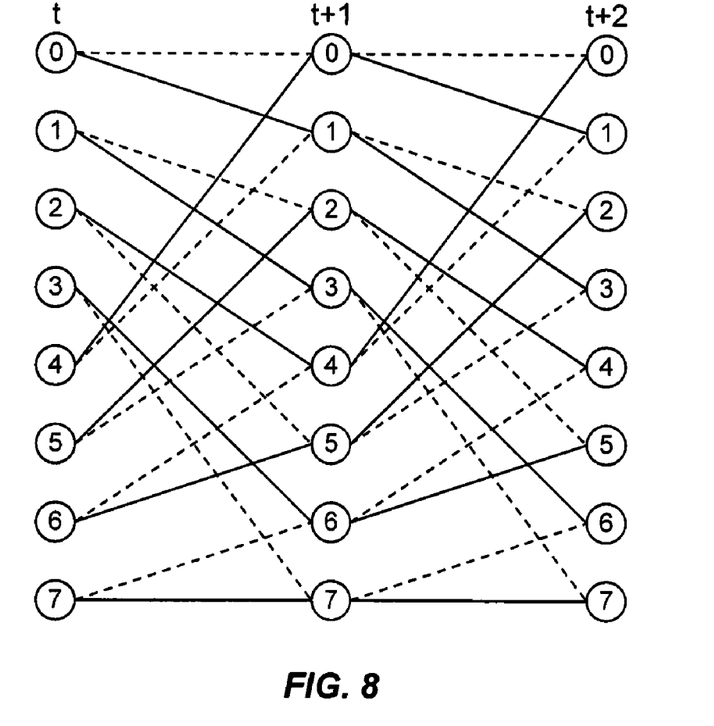
FIG. 8 is a state transition diagram of the W-CDMA turbo code, for two systematic bits.

FIG. 8 illustrates the state transition diagram of the W-CDMA turbo code according to two systematic bits, where transitions according to systematic bit values of one are shown with solid lines, and transitions according to systematic bit values of zero are shown with dashed line. In the radix-4 turbo decoder, the decoders compute the forward and backward state metrics only for even-indexed trellis stages. For instance, the forward stage metric for state 0 at time t+2 can be computed from those at time t as follows:

$$\alpha_{t+2}(0) = COM(\alpha_{t+1}(0) + \gamma_{t+1}(0,0), \alpha_{t+1}(4) + \gamma_{t+1}(4,0)) \quad (20)$$

$$= COM\begin{pmatrix} \alpha_t(0) + \gamma_t(0,0) + \gamma_{t+1}(0,0), \\ \alpha_t(4) + \gamma_t(4,0) + \gamma_{t+1}(0,0), \\ \alpha_t(2) + \gamma_t(2,4) + \gamma_{t+1}(4,0), \\ \alpha_t(6) + \gamma_t(6,4) + \gamma_{t+1}(4,0), \end{pmatrix}.$$

Based on the forward and backward metrics available at even-index trellis stages, the log-likelihood values for systematic and parity bits at time t and t+1 can be computed by the following procedure.

First, intermediate probability values are calculated:

$\phi_0 = COM(\alpha_t(0) + \gamma_t(0,0) + \gamma_{t+1}(0,0) + \beta_{t+2}(0), \alpha_t(3) + \gamma_t(3,7) + \gamma_{t+1}(7,6) + \beta_{t+2}(6))$ $\phi_1 = COM(\alpha_t(1) + \gamma_t(1,2) + \gamma_{t+1}(2,5) + \beta_{t+2}(5), \alpha_t(2) + \gamma_t(2,5) + \gamma_{t+1}(5,3) + \beta_{t+2}(3))$ $\phi_2 = COM(\alpha_t(4) + \gamma_t(4,1) + \gamma_{t+1}(1,2) + \beta_{t+2}(2), \alpha_t(7) + \gamma_t(7,6) + \gamma_{t+1}(6,4) + \beta_{t+2}(4))$ $\phi_3 = COM(\alpha_t(5) + \gamma_t(5,3) + \gamma_{t+1}(3,7) + \beta_{t+2}(7), \alpha_t(6) + \gamma_t(6,4) + \gamma_{t+1}(4,1) + \beta_{t+2}(1))$ $\phi_4 = COM(\alpha_t(0) + \gamma_t(0,0) + \gamma_{t+1}(0,1) + \beta_{t+2}(1), \alpha_t(3) + \gamma_t(3,7) + \gamma_{t+1}(7,7) + \beta_{t+2}(7))$ $\phi_5 = COM(\alpha_t(1) + \gamma_t(1,2) + \gamma_{t+1}(2,4) + \beta_{t+2}(4), \alpha_t(2) + \gamma_t(2,5) + \gamma_{t+1}(5,2) + \beta_{t+2}(2))$ $\phi_6 = COM(\alpha_t(4) + \gamma_t(4,1) + \gamma_{t+1}(1,3) + \beta_{t+2}(3), \alpha_t(7) + \gamma_t(7,6) + \gamma_{t+1}(6,5) + \beta_{t+2}(5))$ $\phi_7 = COM(\alpha_t(5) + \gamma_t(5,3) + \gamma_{t+1}(3,6) + \beta_{t+2}(6), \alpha_t(6) + \gamma_t(6,4) + \gamma_{t+1}(4,0) + \beta_{t+2}(0))$ $\phi_8 = COM(\alpha_t(0) + \gamma_t(0,1) + \gamma_{t+1}(1,2) + \beta_{t+2}(2), \alpha_t(3) + \gamma_t(3,6) + \gamma_{t+1}(6,4) + \beta_{t+2}(4))$ $\phi_9 = COM(\alpha_t(1) + \gamma_t(1,3) + \gamma_{t+1}(3,7) + \beta_{t+2}(7), \alpha_t(2) + \gamma_t(2,4) + \gamma_{t+1}(4,1) + \beta_{t+2}(1))$ $\phi_{10} = COM(\alpha_t(4) + \gamma_t(4,0) + \gamma_{t+1}(0,0) + \beta_{t+2}(0), \alpha_t(7) + \gamma_t(7,7) + \gamma_{t+1}(7,6) + \beta_{t+2}(6))$ $\phi_{11} = COM(\alpha_t(5) + \gamma_t(5,2) + \gamma_{t+1}(2,5) + \beta_{t+2}(5), \alpha_t(6) + \gamma_t(6,5) + \gamma_{t+1}(5,3) + \beta_{t+2}(3))$ $\phi_{12} = COM(\alpha_t(0) + \gamma_t(0,1) + \gamma_{t+1}(1,3) + \beta_{t+2}(3), \alpha_t(3) + \gamma_t(3,6) + \gamma_{t+1}(6,5) + \beta_{t+2}(5))$ $\phi_{13} = COM(\alpha_t(1) + \gamma_t(1,3) + \gamma_{t+1}(3,6) + \beta_{t+2}(6), \alpha_t(2) + \gamma_t(2,4) + \gamma_{t+1}(4,0) + \beta_{t+2}(0))$ $\phi_{14} = COM(\alpha_t(4) + \gamma_t(4,0) + \gamma_{t+1}(0,1) + \beta_{t+2}(1), \alpha_t(7) + \gamma_t(7,7) + \gamma_{t+1}(7,7) + \beta_{t+2}(7))$ $\phi_{15} = COM(\alpha_t(5) + \gamma_t(5,2) + \gamma_{t+1}(2,4) + \beta_{t+2}(4), \alpha_t(6) + \gamma_t(6,5) + \gamma_{t+1}(5,2) + \beta_{t+2}(2))$.

Next, partial sums are calculated from the intermediate probability values:

$\Phi_0 = COM(\phi_0, \phi_1, \phi_2, \phi_3)$ $\Phi_1 = COM(\phi_4, \phi_5, \phi_6, \phi_7)$ $\Phi_2 = COM(\phi_8, \phi_9, \phi_{10}, \phi_{11})$ $\Phi_3 = COM(\phi_{12}, \phi_{13}, \phi_{14}, \phi_{15})$ $\Phi_4 = COM(\phi_0, \phi_6, \phi_9, \phi_{15})$ $\Phi_5 = COM(\phi_2, \phi_4, \phi_{11}, \phi_{13})$ $\Phi_6 = COM(\phi_3, \phi_5, \phi_{10}, \phi_{12})$ $\Phi_7 = COM(\phi_1, \phi_7, \phi_8, \phi_{14})$.

The first four of these partial sums, $\Phi_0$, $\Phi_1$, $\Phi_2$, and $\Phi_3$, correspond to the total probability of consecutive systematic bit values of zero-zero, zero-one, one-zero, and one-one, respectively. Similarly, the last four, $\Phi_4$, $\Phi_5$, $\Phi_6$, and $\Phi_7$, correspond to the total probability of consecutive parity bit values for the transition from time t and t+2 of zero-zero, zero-one, one-zero, and one-one, respectively.

Finally, systematic bit log-likelihood values for both times t and t+1 are calculated from the partial sums:

$$\lambda_s(t) = COM(\Phi_2, \Phi_3) - COM(\Phi_0, \Phi_1), \quad (21)$$

$$\lambda_s(t+1) = COM(\Phi_1, \Phi_3) - COM(\Phi_0, \Phi_2), \quad (22)$$

and parity bit log-likelihood values for times t and t+1 are calculated from the partial sums:

$$\lambda_p(t) = COM(\Phi_6, \Phi_7) - COM(\Phi_4, \Phi_5), \quad (23)$$

$$\lambda_p(t+1) = COM(\Phi_5, \Phi_7) - COM(\Phi_4, \Phi_6). \quad (24)$$

Again, this approach reduces the computational complexity significantly for radix-4 turbo decoding when soft values for the parity bits are desired. According to the brute-force method, 130 additions are needed to calculate a party bit soft value. With the technique disclosed above, only eighteen additions are needed, a reduction of 86%.

Figure 9:
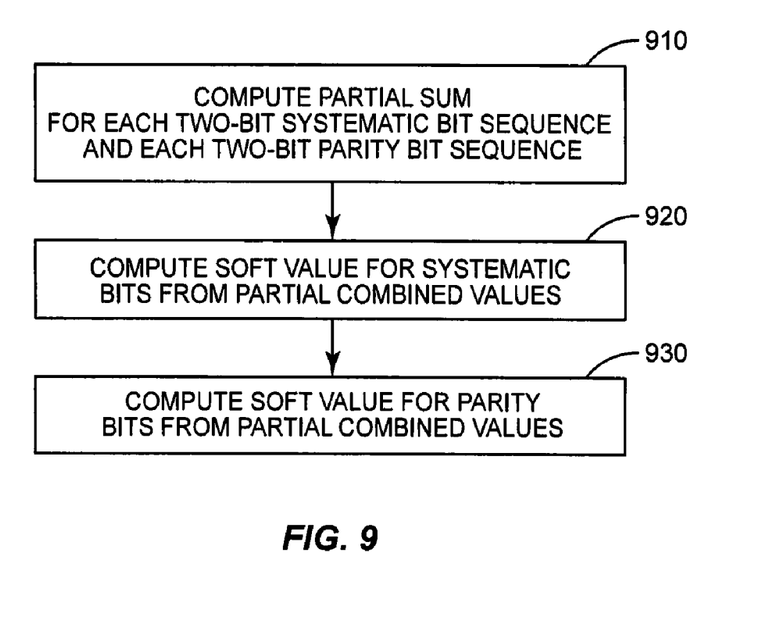
FIG. 9 is a process flow diagram illustrating an exemplary method for computing soft values for two-bit sequences using partial combined values.

In view of the above description of one embodiment of a radix-4 decoding processing according to the present invention, those skilled in the art will appreciate that the process flow diagram of FIG. 9 illustrates the computation of partial sums for a radix-4 decoder, as well as the computation of soft values for systematic bits and parity bits in such a decoder. Thus, as shown at block 910, partial sums are computed for each two-bit systematic bit sequence and for each two-bit parity bit sequence, as discussed above. At block 920, soft values for a consecutive pair of systematic bits are computed from the partial sums, e.g., according to Equations (21) and (22). Likewise, soft values for the corresponding pair of parity bits are computed from the partial sums, e.g., according to Equations (23) and (24).

The present invention may, of course, be carried out in other ways than those specifically set forth herein without departing from essential characteristics of the invention. Thus, for example, the inventive techniques disclosed herein may be applied to decoding processes in WCDMA receivers, as discussed in detail above, or in receivers configured for operation in other wireless networks and/or according to other specific turbo codes. Embodiments of the present invention include methods according to one or more of the techniques described above, decoder circuits configured to carry out one or more of these methods, and wireless receivers including such decoder circuits. The embodiments discussed in detail above are to be considered in all respects as illustrative and not restrictive, and all changes coming within the meaning and equivalency range of the appended claims are intended to be embraced therein.

What is claimed is:

1. A method in a communications receiver for decoding received communications data, the method comprising, for each of at least one iteration in at least one soft-input soft-output decoder:

calculating intermediate probability values associated with each possible transition between a first plurality of candidate decoder states at a first time and a second plurality of candidate decoder states at a second time;

computing two or more partial sums from the intermediate probability values, wherein the partial sums correspond to possible combinations of two or more systematic bits, two or more parity bits, or at least one systematic bit and at least one parity bit;

estimating a soft value for each of at least one systematic bit of the received communications data corresponding to the interval between the first and second times, as a first function of the partial sums; and estimating a soft value for each of at least one parity bit of the received communications data corresponding to the interval between the first and second times, as a second function of the partial sums.

2. The method of claim 1, wherein calculating intermediate probability values associated with each possible transition between a first plurality of candidate decoder states at a first time and a second plurality of candidate decoder states at a second time is based on forward recursion metrics corresponding to each of the first plurality of candidate decoder states, backward recursion metrics corresponding to each of the second plurality of candidate decoder states, and branch metrics corresponding to each branch between the first and second pluralities of candidate decoder states.

3. The method of claim 1, in a radix-2 decoder, wherein computing two or more partial sums comprises computing a partial sum for each possible combination of systematic bit values and parity bit values for the transition between the first and second plurality of candidate decoder states, based on the corresponding intermediate probability values.

4. The method of claim 1, in a radix-4 decoder, wherein computing two or more partial sums comprises computing a partial sum for each possible combination of two consecutive systematic bit values and a partial sum for each possible combination of two consecutive parity bit values, based on the corresponding intermediate probability values.

5. The method claim 1, wherein the estimated soft values for each of the systematic bits, or the estimated soft values for each of the parity bits, or both, comprise log-likelihood values.

6. A decoder circuit configured to, for each of at least one iteration in at least one soft-input soft-output decoding process:

calculate intermediate probability values associated with each possible transition between a first plurality of candidate decoder states at a first time and a second plurality of candidate decoder states at a second time;

compute two or more partial sums from the intermediate probability values, the partial sums corresponding to possible combinations of two or more systematic bits, two or more parity bits, or at least one systematic bit and at least one parity bit;

estimate a soft value for each of at least one systematic bit of the received communications data corresponding to the interval between the first and second times, as a first function of the partial sums; and estimate a soft value for each of at least one parity bit of the received communications data corresponding to the interval between the first and second times, as a second function of the partial sums.

7. The decoder circuit of claim 6, wherein the decoder circuit is configured to calculate intermediate probability values associated with each possible transition between a first plurality of candidate decoder states at a first time and a second plurality of candidate decoder states at a second time based on forward recursion metrics corresponding to each of the first plurality of candidate decoder states, backward recursion metrics corresponding to each of the second plurality of candidate decoder states, and branch metrics corresponding to each branch between the first and second pluralities of candidate decoder states.

8. The decoder circuit of claim 6, wherein the decoder circuit is configured to use a radix-2 decoding process and is configured to compute the two or more partial sums by computing a partial sum for each possible combination of systematic bit values and parity bit values for the transition between the first and second plurality of candidate decoder states, based on the corresponding intermediate probability values.

9. The decoder circuit of claim 6, wherein the decoder circuit is configured to use a radix-4 decoding process and is configured to compute the two or more partial sums by computing a partial sum for each possible combination of two consecutive systematic bit values and a partial sum for each possible combination of two consecutive parity bit values, based on the corresponding intermediate probability values.

10. The decoder circuit of claim 6, wherein the estimated soft values for each of the systematic bits, or the estimated soft values for each of the parity bits, or both, comprise log-likelihood values.

11. A communications receiver configured to receive communications data encoded at a communications transmitter by a turbo encoder comprising two constituent convolutional encoders, the communications receiver comprising a turbo decoding circuit that comprises two convolutional decoder circuits, wherein each of the convolutional decoder circuits is configured to, for each of at least one iteration in at least one soft-input soft-output decoding process:

calculate intermediate probability values associated with each possible transition between a first plurality of candidate decoder states at a first time and a second plurality of candidate decoder states at a second time;

compute two or more partial sums from the intermediate probability values, the partial sums corresponding to possible combinations of two or more systematic bits, two or more parity bits, or at least one systematic bit and at least one parity bit;

estimate a soft value for each of at least one systematic bit of the received communications data corresponding to the interval between the first and second times, as a first function of the partial sums; and estimate a soft value for each of at least one parity bit of the received communications data corresponding to the interval between the first and second times, as a second function of the partial sums.

12. The communications receiver of claim 11, wherein the convolutional decoder circuits are configured to calculate intermediate probability values associated with each possible transition between a first plurality of candidate decoder states at a first time and a second plurality of candidate decoder states at a second time based on forward recursion metrics corresponding to each of the first plurality of candidate decoder states, backward recursion metrics corresponding to each of the second plurality of candidate decoder states, and branch metrics corresponding to each branch between the first and second pluralities of candidate decoder states.

13. The communications receiver of claim 11, wherein the convolutional decoder circuits are configured to use a radix-2 decoding process and are further configured to compute the two or more partial sums by computing a partial sum for each possible combination of systematic bit values and parity bit values for the transition between the first and second plurality of candidate decoder states, based on the corresponding intermediate probability values.

14. The communications receiver of claim 11, wherein the convolutional decoder circuits are configured to use a radix-4 decoding process and are further configured to compute the two or more partial sums by computing a partial sum for each possible combination of two consecutive systematic bit values and a partial sum for each possible combination of two consecutive parity bit values, based on the corresponding intermediate probability values.

15. The communications receiver of claim 11, wherein the estimated soft values for each of the systematic bits, or the estimated soft values for each of the parity bits, or both, comprise log-likelihood values.

* * * * *

UNITED STATES PATENT AND TRADEMARK OFFICE
CERTIFICATE OF CORRECTION

PATENT NO.         : 8,271,858 B2
APPLICATION NO.    : 12/553324
DATED              : September 18, 2012
INVENTOR(S)        : Wang et al.

It is certified that error appears in the above-identified patent and that said Letters Patent is hereby corrected as shown below:

On the Cover Page, item (73), under "Assignee", in Column 1, Line 1,
delete "Telefonaktiebolget" and insert -- Telefonaktiebolaget --, therefor.

In Column 7, Line 65, delete "$B_{t+1}$" and insert -- $\beta_{t+1}$ --, therefor.

In Column 9, Line 53, delete "states)" and insert -- states") --, therefor.

In Column 15, Line 57, in Claim 5, delete "method" and insert -- method of --, therefor.

Signed and Sealed this
Fourth Day of December, 2012

David J. Kappos
*Director of the United States Patent and Trademark Office*